United States Patent Office 3,806,539
Patented Apr. 23, 1974

3,806,539
PREPARATION OF GLYCOLATES
Jonathan Morris Kliegman, Charleston, and Robert Keith Barnes, South Charleston, W. Va., assignors to Union Carbide Corporation, New York, N.Y.
No Drawing. Filed Aug. 23, 1972, Ser. No. 282,975
Int. Cl. C07c 69/66
U.S. Cl. 260—484 R                   6 Claims

ABSTRACT OF THE DISCLOSURE

Glycolates are produced by the direct reaction of glyoxal and a hydroxyl compound by heating a mixture thereof at an elevated tempertaure in contact with a strong acid catalyst.

BACKGROUND OF THE INVENTION

Glycolates have been prepared in the past by the reaction of glycolic acid, or its esters or halide derivatives, with the corresponding appropriate alcohol. These known procedures have been very inefficient and expensive. In a limited manner, the glycolates have also been prepared by the hot tube pyrrolysis of acetals at temperatures of about 300° C. or higher using cerium oxide as catalyst.

SUMMARY OF THE INVENTION

It has now been found that glycolates can be produced by the direct reaction of glyoxal with a hydroxyl containing compound by heating the mixture at an elevated temperature in the presence of a strong acid catalyst. In the process of this invention glycolates have been produced at yields ranging as high as about 90 percent.

DESCRIPTION OF THE INVENTION

In the process of this invention a glyoxal is reacted with a primary or secondary aliphatic alcohol to produce the corresponding glycolate. During the reaction there is present in the mixture a strong acid catalyst at a concentration of at least about 0.01 weight percent, preferably from 1 to 40 weight percent, based on the weight of the aqueous glyoxal solution.

The strong acids suitable for use as catalysts in the invention are those which have a pK value of less than one. Illustrative of suitable strong acids one can mention sulfuric acid, p-toluenesulfonic acid, hydrochloric acid, or any other acid having a pK value less than one.

The reaction of glyoxal with the alcohol produces the glycolate, water and an olefin and can be represented by the equation:

As can be seen, this equation requires the presence of three moles of alcohol per mole of glyoxal. Any primary alcohol or secondary aliphatic alcohol can be used in the reaction and it is generally used in excess to drive the reaction to completion and to act as the solvent. The alcohols are known and can be represented by the formula ROH wherein the R group can be the same or different and can be alkyl of from 1 to 30 carbon atoms, for example methyl, ethyl, n-propyl, isopropyl, n-butyl, isobutyl, sec-butyl, n-amyl and various isomers thereof such as, for example, 1-methyl-butyl, 2-methyl-butyl, 1,2-dimethyl-propyl, 2,2-dimethyl-propyl and 1-ethylpropyl, and the corresponding straight and branched chain isomers of hexyl, heptyl, octyl, nonyl, decyl, undecyl, dodecyl, tridecyl, tetradecyl, pentadecyl, hexadecyl, heptadecyl, octadecyl, nonadecyl, and eicosyl or alkenyl of from 3 to 30 carbon atoms, wherein the double bond is not on the hydroxyl-substituted carbon atom, for example, 2-propenyl, 2-butenyl, 3-butenyl and the corresponding branched chain isomers thereof such as, for example, 2-isobutenyl, 2-sec-butenyl, including 2-pentenyl, 3-pentenyl, 4-pentenyl and the corresponding branched chain isomers thereof; 2-hexenyl, 3-hexenyl, 4-hexenyl, 5-hexenyl and the corresponding branched chain isomers thereof such as, for example, 2,3-dimethyl-2-butenyl, 2,3 - dimethyl-3-butenyl, 1 - methyl-1-ethyl-2-propenyl and the various isomers of heptenyl, octenyl, nonenyl, decenyl, undecenyl, dodecenyl, triceneyl, tetradecenyl, pentadecenyl, hexadecenyl, heptadecenyl, octadecenyl, nonodecenyl and eicosenyl; or cycloalkyl or cycloalkenyl of from 3 to 30 ring carbon atoms, for example, cyclopropyl, cyclobutyl, cycloamyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctadecyl, cyclononadecyl, cycloeicosyl, α-cyclopropyl-ethyl, β-cyclopropyl-ethyl, α-cyclobutyl-propyl, β-cyclobutyl-propyl, gamma-cyclobutylpropyl, α-cycloamyl-isopropyl, β-cycloamyl-isopropyl; or aralkyl of from 6 to 18 ring carbon atoms, for example, benzyl, phenethyl, and naphthal. As previously indicated alcohols having an unsaturated bond on the hydroxyl-containing carbon atom are not desirable. It was also found that tertiary alcohols will not react in this process. The R groups can be substituted with substituents which will not unduly interfere with the main reaction.

The glycolates are useful as solvents, high temperature lubricants, and reflow solvents in paints such as automotive paints.

The reaction can be carried out at a temperature of from about 75° C. up to the reflux temperature of the reaction mixture. The preferred temperature is from about 100° C. to about 250° C. The reaction can be carried out at subatmospheric, atmospheric, or superatmospheric pressure and pressure is not critical for the satisfactory conductance of the process.

Generally, the reaction is completed within 4 to 8 hours. However, the time will vary depending upon the particular alcohol being employed, the temperature, the catalyst, and the size of the batch; therefor, no specific time range can be recited with certainty.

In a typical reaction, the alcohol and glyoxal are heated at reflux in the presence of the strong acid catalyst. During the reaction water initially present or formed is removed azeotropically by the boiling excess alcohol or by an added azeotroping agent, such as benzene; completion of the reaction is indicated when water is no longer observed in the distillate. At this point, the reaction mixture is distilled at reduced pressure and the glycolate is recovered. The following examples serve to illustrate the invention.

EXAMPLE 1

A mixture of 370 grams of n-butanol and 145 grams of a 40 percent aqueous glyoxal solution was mixed with 17.5 grams of sulfuric acid as catalyst and then heated to the reflux temperature. An azeotrope of water and the alcohol began to distill at a kettle temperature of 97° C. and a head temperature of 96° C. The water was removed from the azeotrope and the alcohol was returned to the reaction vessel. After all the water had distilled the distillation was continued at atmospheric pressure allowing the temperature in the reaction vessel to rise and reach a 140° C. During this period olefinic by-products and other by-products distill and are removed. The temperature of the kettle was maintained at 160° C. to 170° C. for one-half to one hour, neutralized with base, and the distillation was continued. There were recovered, at a pressure of 3 mm. to 4 mm. of mercury and a temperature of 84° C. to 100° C., 119 grams of butyl butoxyacetate, representing a yield of 60 percent based on glyoxal.

EXAMPLE 2

In a manner similar to that described in Example 1, a mixture of 370 grams of n-butanol and 145 grams of a 40 percent aqueous glyoxal solution were reacted using 0.2 gram of p-toluenesulfonic acid as the catalyst. There were recovered 17.3 grams of butyl butoxyacetate, representing a yield of 9 percent based on glyoxal charged. In this example the kettle temperature was 90° C. to 110° C. and the head temperature was 90° C. to 105° C. during the azeotropic distillation that required 5 hours. The butyl butoxyacetate was recovered by distillation at a pressure of 8 mm. to 10 mm. of mercury at a temperature of 80° C. to 95° C.

EXAMPLE 3

Following the procedure described in Example 1, 370 grams of n-butanol and 145 grams of a 40 percent aqueous glyoxal solution were reacted using 18 grams of p-toluenesulfonic acid as the strong acid catalyst. There were recovered 162.8 grams of butyl butoxyacetate, representing a yield of 86.6 percent based on the glyoxal charged.

EXAMPLE 4

Following the procedure described in Example 1, 650 grams of 2-ethylhexanol and 145 grams of a 40 percent aqueous glyoxal solution were reacted using 18 grams of p-toluenesulfonic acid as the catalyst. There were recovered 270.6 grams of 2-ethylhexyl 2-ethylhexoxyacetate, representing a yield of 90.2 percent based on glyoxal. In this example the kettle temperature was 155° C. and the head temperature was 90° C. during the azeotropic distillation. Then the kettle temperature was maintained at 200° C. to 226° C. for one hour and the product was finally recovered by distillation at a pressure of 1 mm. to 2 mm. of mercury and a temperature of 120° C. to 160° C.

EXAMPLE 5

A mixture of 500 grams of cyclohexanol and 145 grams of a 40 percent aqueous glyoxal solution was heated to a reflux temperature of 121° C. in the presence of one gram of p-toluenesulfonic acid as the catalyst. The water from the aqueous glyoxal and the water of reaction were removed azeotropically at a vapor temperature of 101° C. together with some cyclohexanol. The temperature in the reactor kettle was maintained at 121° C. during the azeotropic distillation. When water ceased to distill overhead (116.9 grams total) the solution in the reactor was distilled under reduced pressure to give two main fractions. The first fraction was cyclohexanol distilling at a vapor temperature of 40° C. to 68° C. at a pressure of 3 mm. of mercury; this fraction weighed 174.7 grams. The second fraction weighing 216.5 grams was cyclohexyl cyclohexoxyacetate distilling at a vapor temperature of 130° C. to 137° C. at a pressure of 3 mm. of mercury, representing a yield of 90.3 percent based on glyoxal. This latter compound had an $n_D^{25}$ of 1.4700. There were also recovered 35 grams of cyclohexene as a by-product and a residue weighing 65 grams.

EXAMPLE 6

In a manner similar to that described in Example 2, a mixture containing 290 grams of 80 percent aqueous glyoxal solution, 1,000 grams of methanol and 182 grams of p-toluenesulfonic acid in two liters of chloroform was heated at reflux for four days. No water azeotrope was observed, so the chloroform-methanol azeotrope was distilled with the addition of fresh chloroform until no more methanol was observed in the distillation. At that point, a water-chloroform azeotrope began to distill over, and the mixture was neutralized with sodium carbonate, filtered and the water removed by azeotropic distillation with chloroform. The residue product was distilled on a spinning-band column and 25.7 grams of methyl methoxyacetate were recovered at a temperature of 67° C. to 68° C. and a pressure of 110 mm. of mercury; it had an $n_D^{25}$ of 1.3968. Byproducts recovered included 1,1,2,2 - tetrakis(methoxy)ethane, 2-dimethoxymethyl-4,5-dimethoxy-1,3-dioxolane and an unidentified compound.

EXAMPLE 7

In a manner similar to that described in Example 2, 510 grams of hexanol and 145 grams of a 40 percent aqueous glyoxal solution were reacted using one gram of p-toluenesulfonic acid as the catalyst. There were recovered 18.4 grams of hexyl hexoxyacetate, representing a yield of 8 percent based on the glyoxal charged. In this example the kettle temperature was 100° C. to 120° C. and the head temperature was 90° C. to 100° C. during the azeotropic distillation that required about seven hours. Hexyl hexoxyacetate was recovered by distillation at a pressure of 3 mm. to 4 mm. of mercury and a temperature of 115° C. to 125° C.

EXAMPLE 8

In a manner similar to that described in Example 2, 440 grams of 2-pentanol and 145 grams of a 40 percent aqueous glyoxal solution were reacted using one gram of p-toluenesulfonic acid as the catalyst. There were recovered 18 grams of pentyl pentoxyacetate, representing a yield of 8 percent based on glyoxal charged. In this example the kettle temperature was 100° C. to 132° C. and the head temperature was 100° C. to 112° C. during the azeotropic distillation that required 6 hours. The pentyl pentoxyacetate was recovered by distillation at a pressure of 3 mm. of mercury and a temperature of 100° C. to 110° C.

EXAMPLE 9

In a manner similar to that described in Example 2, 430 grams of cyclopentanol and 145 grams of a 40 percent aqueous glyoxal solution were reacted using 0.3 gram of p-toluenesulfonic acid as the catalyst. There were recovered 5.1 grams of cyclopentyl cyclopentoxyacetate, representing a yield of 8 percent based on glyoxal charged. In this example the kettle temperature was 90° C. at 760 mm. to 109° C. at 190 mm. and the head temperature was 89° C. at 760 mm. to 94° C. at 190 mm. of mercury during the azeotropic distillation that required 8 hours. The cyclopentyl cyclopentoxyacetate was recovered by distillation at a pressure of 4 mm. to 6 mm. of mercury at a temperature of 50° C. to 64° C.

EXAMPLE 10

In a manner similar to that described in Example 2, 370 grams of 2-butanol and 145 grams of a 40 percent aqueous glyoxal solution were reacted using 0.5 gram of p-toluenesulfonic acid as the catalyst, benzene was present as an azeotroping agent. There were recovered 18 grams of 1-methylpropyl 1-methylpropoxyacetate, representing a yield of 8 percent based on glyoxal charged. In this example the kettle temperature was 90° C. to 120° C. and the head temperature was 90° C. to 135° C. during the azeotropic distillation that required 6 hours. The 1-methylpropyl 1-methylpropoxyacetate was recovered by distillation at a pressure of 5 mm. to 10 mm. of mercury at a temperature of 90° C. to 98° C.

EXAMPLE 11

In a manner similar to that described in Example 2, 5,739 grams of allyl alcohol and 3,251 grams of a 40 percent aqueous glyoxal solution were reacted using 30 grams of 50 percent aqueous sulfuric catalyst. Four kilograms of benzene were added as azeotroping agent. There were recovered 514.6 grams of allyl allyloxyacetate, representing a yield of 14.7 percent based on glyoxal charged. In this example the kettle temperature was 70° C. to 85° C. and the head temperature was 60° C. to 73° C. during the azeotropic distillation that required 50 hours. The allyl allyloxyacetate was recovered by distillation at a pressure of 1 mm. to 2 mm. of mercury at a temperature of 64° C. to 85° C.

We claim:

1. A process for the preparation of glycolates which comprises reacting with each mole of glyoxal three moles of a primary or secondary aliphatic alcohol having up to 30 carbon atoms at an elevated temperature up to the reflux temperature of the reaction mixture in contact with a strong acid catalyst for a period of time sufficient to produce said glycolates.

2. A process as claimed in claim 1 wherein said alcohol is a saturated primary aliphatic alcohol.

3. A process as claimed in claim 1 wherein the temperature is from 75° C. up to the reflux temperature of the reaction mixture.

4. A process as claimed in claim 1 wherein the acid catalyst has a pK value of less than one.

5. A process as claimed in claim 1 wherein the catalyst is sulfuric acid.

6. A process as claimed in claim 1 wherein the catalyst is para-toluenesulfonic acid.

References Cited

Noller: Chem. of Organic Cmpds. (2nd ed.) p. 771, W. B. Saunders 1960.

LORRAINE A. WEINBERGER, Primary Examiner

P. J. KILLOS, Assistant Examiner

U.S. Cl. X.R.

260—340.7, 468 K, 468 H, 473 A, 615 R, 682